(12) United States Patent
Hilsum

(10) Patent No.: US 12,338,340 B2
(45) Date of Patent: Jun. 24, 2025

(54) FORCE OR PRESSURE SENSING COMPOSITE MATERIAL

(71) Applicant: Infi-Tex Ltd., Stanmore (GB)

(72) Inventor: Cyril Hilsum, Pinner (GB)

(73) Assignee: Infi-Tex Ltd., Stanmore (GB)

( * ) Notice: Subject to any disclaimer, the term of this patent is extended or adjusted under 35 U.S.C. 154(b) by 788 days.

(21) Appl. No.: 17/608,718

(22) PCT Filed: Apr. 9, 2020

(86) PCT No.: PCT/GB2020/050925
§ 371 (c)(1),
(2) Date: Nov. 3, 2021

(87) PCT Pub. No.: WO2020/225524
PCT Pub. Date: Nov. 12, 2020

(65) Prior Publication Data
US 2022/0275169 A1    Sep. 1, 2022

(30) Foreign Application Priority Data

May 3, 2019 (GB) ...................... 1906257

(51) Int. Cl.
*C08K 3/30* (2006.01)
*G01L 1/18* (2006.01)
*H01B 1/22* (2006.01)
*H01C 1/14* (2006.01)

(52) U.S. Cl.
CPC .................. *C08K 3/30* (2013.01); *G01L 1/18* (2013.01); *H01B 1/22* (2013.01); *H01C 1/14* (2013.01); *C08K 2003/3009* (2013.01); *C08K 2201/003* (2013.01)

(58) Field of Classification Search
None
See application file for complete search history.

(56) References Cited

U.S. PATENT DOCUMENTS

| 3,489,242 A * | 1/1970 | Gladding ............... B32B 27/40 524/413 |
| 4,314,227 A | 2/1982 | Eventoff |
| 4,489,302 A | 12/1984 | Eventoff |

(Continued)

FOREIGN PATENT DOCUMENTS

| CN | 101747643 A | 6/2010 |
| CN | 106197784 B | 1/2019 |

(Continued)

OTHER PUBLICATIONS

International Search Report and Written Opinion of the International Searching Authority, dated Jun. 23, 2020, issued in connection with International Appln. No. PCT/GB2020/050925 (8 pages).

(Continued)

*Primary Examiner* — John J Figueroa
(74) *Attorney, Agent, or Firm* — McCarter & English, LLP

(57) ABSTRACT

A composite material having a force- or pressure-dependent resistance comprises particles of inorganic chalcogenide dispersed in a polymer. The chalcogenide may be a pyrite such as iron pyrite, copper iron pyrite or a mixture of the two. The composite material may be used in a force or pressure sensor, for example in a wearable device.

20 Claims, 1 Drawing Sheet

(56) References Cited

U.S. PATENT DOCUMENTS

| | | | |
|---|---|---|---|
| 5,296,837 | A | 3/1994 | Yaniger |
| 5,302,936 | A | 4/1994 | Yaniger |
| 6,495,069 | B1 | 12/2002 | Lussey et al. |
| 8,449,974 | B2 | 5/2013 | Lussey et al. |
| 8,765,027 | B2 | 7/2014 | Lussey et al. |
| 9,538,924 | B1 | 1/2017 | Asiri et al. |
| 9,546,859 | B2 | 1/2017 | Lussey et al. |
| 2013/0126799 | A1* | 5/2013 | Naoi .................. H01B 1/02 252/514 |
| 2021/0246243 | A1* | 8/2021 | Dubois .................. C08K 3/01 |
| 2022/0291061 | A1* | 9/2022 | He .................. G01L 1/2287 |

FOREIGN PATENT DOCUMENTS

| | | |
|---|---|---|
| GB | 2462920 A | 3/2010 |
| GB | 2541288 A | 2/2017 |
| GB | 2564337 A | 1/2019 |
| GB | 2564737 A | 1/2019 |
| JP | S61215661 A | 9/1986 |
| JP | H05196524 A | 8/1993 |
| WO | 89/02727 A1 | 4/1989 |
| WO | 2015/049067 A2 | 4/2015 |

OTHER PUBLICATIONS

Written Opinion of the International Preliminary Examining Authority, dated Aug. 31, 2020, issued in connection with International Appln. No. PCT/GB2020/050925 (6 pages).
International Preliminary Report on Patentability, dated Jul. 22, 2021, issued in connection with International Appln. No. PCT/GB2020/050925, including annexed copies of Amendment under PCT Article 19 and Applicant's responses to the Written Opinions (15 pages).
Search Report dated Sep. 30, 2020, issued in connection with UK Patent Appln. No. GB1906257.9 (4 pages).
Examination Report dated Nov. 18, 2020, issued in connection with UK Patent Appln. No. GB1906257.9 (3 pages).
Examination Report dated Apr. 29, 2021, issued in connection with UK Patent Appln. No. GB1906257.9 (4 pages).
Bloor et al., "A metal-polymer composite with unusual properties," Journal of Physics D: Applied Physics, vol. 38, No. 16, pp. 2851-2860, Aug. 2005 (31 pages).
Chiu, "A Review on Conduction Mechanisms in Dielectric Films," Abstracts in Materials Science and Engineering 2014, Article ID578168, Feb. 2014 (19 pages).
Chakraborty, "Investigation of sub-bandgap absorption in iron pyrite: optical and electrical measurements," Thesis: S. M., Massachusetts Institute of Technology, Department of Mechanical Engineering, Feb. 2014, Abstract and Conclusion (2 pages).
Dempsey et al., "Tactile Sensing in Human-Computer Interfaces: The Inclusion of Pressure Sensitivity as a Third Dimension of User Input," Sensors and Actuators A: Physical, vol. 232, pp. 279-250, Aug. 2015 (47 pages).
Herbert et al., "Quantification of electronic band gap and surface states on FeS2(100)", Surface Science, vol. 618, pp. 53-61, Aug. 2013 (9 pages).
Latham et al., "Innovative Aqueous Dispersions for Use in Coating Applications," Dow Chemical Company, 2003 (7 pages).
Lazic et al., "Low intensity conduction states in FeS2: implications for absorption, open-circuit voltage and surface recombination," Journal of Physics: Condensed Matter, vol. 25, No. 46, Oct. 2013 (10 pages).
Sancaktar at al., "Pressure Dependent Conduction Behavior of Various Particles for Conductive Adhesive Applications," Journal of Adhesion Science and Technology, vol. 13, No. 6, pp. 679-693, Jan. 1999 (15 pages).
Sancaktar at al., "The effect of pressure on the initial establishment of conductive paths in electronically conductive adhesives," Journal of Adhesion Science and Technology, vol. 10, No. 11, pp. 1221-1235, Jun. 1996 (15 pages).
Von Oertzen et al., "XPS and ab initio calculation of surface states of sulfide minerals: Pyrite, chalcopyrite and molybdenite," Molecular Simulation, vol. 32, No. 15, pp. 1207-1212, Dec. 2006 (6 pages).
Webb et al., "A multi-component nanocomposite screen-printed ink with non-linear touch sensitive electrical conductivity," Nanotechnology, vol. 24, No. 16, 165501, Mar. 2013 (9 pages).
Wei et al., "Dependence of electrical conduction on the film thickness of conductive adhesives: modeling, computer simulation, and experiment," Journal of Adhesion Science and Technology, vol. 10, No. 11, pp. 1199-1219, Jun. 1996 (21 pages).
Weidenfeller et al., "Thermal and electrical properties of magnetite filled polymers," Composites Part A: Applied Science and Manufacturing, vol. 33, No. 8, pp. 1041-1053, Aug. 2002 (13 pages).
Bona—Bona Mega Technical Data Sheet, Aug. 2011 (2 pages).
DSM—Advanced Polymer Technologies for Printing & Packaging, 2017 (15 pages).
DSM—NeoRez R-3961 XP Product Data Sheet, Jan. 2018 (1 page).
Sun Chemical Screen—Vynaglaze APR 47-00 Series Screen Inks Product Data Sheet, Jul. 2007 (3 pages).
Sericol—Polyplast PY & APR Varnish Product Information (6 pages).
Rust-Oleum—Varathane Water-based Floor Polyurethane Technical Data Sheet, May 2018 (2 pages).

* cited by examiner

FORCE OR PRESSURE SENSING COMPOSITE MATERIAL

RELATED APPLICATIONS

The present application is a U.S. National Phase Application under 35 U.S.C. § 371 of International Application No. PCT/GB2020/050925 filed on Apr. 9, 2020, which claims the benefit of United Kingdom (Great Britain) Patent Application No. 1906257.9 filed on May 3, 2019, the entire disclosures of which are expressly incorporated by reference herein.

FIELD OF THE INVENTION

The present invention relates to a force or pressure sensing composite material, a force or pressure sensor using said composite material, and applications thereof.

BACKGROUND OF THE INVENTION

Force sensing composite materials comprising electrically conducting and/or semiconducting particles disposed in an insulating matrix, such as a polymer, are known. The resistance of such composite materials, and the variation of that resistance as a function of applied force or pressure, may depend on one or more different factors as described below. The resistance may be measured between a pair of electrodes, with force or pressure being applied on one of the electrodes in a direction towards the other electrode.

One factor is the volume fraction of the composite material, i.e. the volume of particles as a fraction of the total volume of the composite material. At low volume fractions, the particles are electrically insulated from each other and there is no electrically conductive path between the electrodes. As the volume fraction increases, so does the number of electrically conductive paths between the electrodes due to contact between the particles, and the resistance decreases due to a percolation effect. Since the elastic moduli of polymers is much less than that of metals or inorganic oxide crystals, the effect of increasing pressure on the composite material at volume fractions higher than 0.25 is equivalent to an increase in the volume fraction and gives a mixture that decreased in resistance with pressure or force, as disclosed for example in GB-A-2541288 and GB-A-2564737.

The percolation resistance is largely dependent on the particle material resistivity, which will be high for high energy gap materials such as oxides. However, such materials also have a high work function, which reduces the probability of conduction through the polymer, so preventing the composite material having a low resistance at high pressures.

Another factor is the distance between particles. At short distances between particles, quantum tunnelling of carriers between adjacent particles can occur, thus reducing the electrical resistance. The application of force or pressure reduces the distance between particles, thereby increasing the quantum tunnelling effect and reducing the resistance. Quantum tunnelling falls off exponentially with distance, so this effect is only relevant for very small particle separation distances. In a composite material with equal volumes of polymer and particles, the mean polymer thickness around a particle is one-third of the particle radius, so even for particles as small as 1 micron in diameter, the polymer thickness will on average exceed 100 nm, and the tunnelling effect would be very small.

The quantum tunnelling effect increases with electrical field strength. The localised electrical field strength may be increased by using acicular or 'spiky' particles, as disclosed for example in GB-A-2462920. However, additional processing steps or specific conditions may be required to produce acicular particles.

In composite materials using nickel particles, such as disclosed in U.S. Pat. No. 6,495,069, the particles are likely to have a thin surface layer of insulating oxide, sufficiently thin that tunnelling may occur. This effect is described by Bloor et al in J Phys D: App Phys 38, 2851-2860, 2005 for nickel particles and Webb et al in Nanotechnology 24, 165501, 2013 for acicular particles of tin oxide and antimony oxide. In both of these structures it is thought the acicular spikes lead to thin layers of polymer, through which carriers can tunnel. If the particles are not acicular, it is still possible for an insulating film to pass current, as described in Chiu, A Review on Conduction Mechanisms in Dielectric Films, Abstracts in Materials Science and Engineering 2014, Article ID578168, 2014.

Another factor is the contact between one of the electrodes and the particles. In some designs, a layer of the composite material is applied to a first electrode and a second, floating electrode is placed on the upper surface of the layer, or force is applied to the upper surface of the layer by a metal probe acting as a second electrode. The particles at the upper surface project from the layer to varying degrees and may come into contact with the second electrode in a discontinuous fashion as force or pressure is applied. Force sensors that exploit this effect are disclosed in U.S. Pat. Nos. 4,314,227, 4,489,302, 5,296,837, 5,302,936 and 9,546,859.

A summary of pressure sensitive resistance sensors is provided in S J Dempsey et al, Tactile Sensing in Human-Computer interfaces, Sensors and Actuators A Physical 232, 279-250, 2015, in which the existing sensors described are all based on particles of metals, such as nickel, or oxides, such as tin oxide or magnetite. To obtain a large working range of resistance, the particles comprise a mixture of two or more materials. It would be desirable to have a sensor which employed just one type of particle, since this would make processing simpler and cheaper.

The conductivity mechanism of the composite material may vary with the applied force or pressure. This is examined in detail by Bloor et al in J Phys D: App Phys 38, 2851-2860, 2005 where the departures from Ohm's Law are shown to be large for nickel dispersed in silicone. It would be preferable if the departures from Ohm's Law were small.

SUMMARY OF THE INVENTION

According to one aspect of the present invention, there is provided a composite material having a force- or pressure-dependent resistance, the composite material comprising particles of inorganic chalcogenide dispersed in an insulator such as a polymer. The term 'chalcogenide' is not intended to include an oxide.

Preferably, the chalcogenide comprises a sulphide, and most preferably a pyrite, such as iron pyrite ($FeS_2$) or copper iron pyrite (chalcopyrite, $CuFeS_2$), or a mixture of particles of both materials. For such compounds, the resistivity is high but the work function is comparatively low. For iron pyrite, the surface has an energy gap less than half that of the body (see Herbert et al Surface Science 618, 53-61, 2013), making it much easier for electrons to pass from the particle into and through the polymer. As a result, a layer of such a composite material may have a resistance that is strongly dependent on force over a large force range. The effect may be due to low energy surface states, as measured by Von Oertzen et al in Molecular Simulation, 32, 1207-1212, 2006. That paper showed there were similar states in chalcopyrite, which is therefore also a good candidate for this type of sensor. However, the present invention is not limited to the application of any particular theory.

Zinc sulphide (ZnS) has also been shown to have surface states that are low in energy and may be suitable for certain applications, although its resistivity is high. Bornite ($Cu_5FeS_4$) may also be suitable for certain applications, although its resistivity is low. Preferably, the resistivity of the inorganic chalcogenide is in the range 10 ohm-cm to 10,000 ohm-cm.

The particles may be substantially all (e.g. >95% and preferably >99%) of inorganic chalcogenide, without other particle components such as metal or carbon particles.

The particles need not be acicular, but may be approximately cubic or spherical, such as obtained from powdered crystal.

According to another aspect of the present invention, there is provided a force or pressure sensor comprising a layer of the above composite material arranged in electrical contact between first and second electrodes, such that force or pressure between the electrodes reduces the resistance of the layer. The layer may be formed on a surface of metal, plastic or textile.

According to another aspect of the present invention, there is provided a wearable sensor comprising the above sensor having a flexible substrate forming part of a wearable device.

BRIEF DESCRIPTION OF THE DRAWINGS

Specific embodiments of the present invention are described below with reference to the accompanying drawings, in which.

DETAILED DESCRIPTION OF EMBODIMENTS

Figure 1:
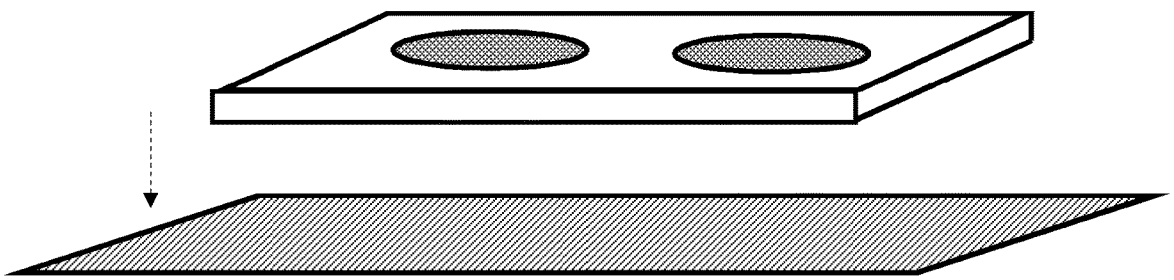
FIG. 1 shows an experimental arrangement for measuring resistance of a composite material, as a function of pressure.

FIG. 1 shows a structure for testing the dependence of resistance on force for a sample composite material. A base 1 is made of mica sheet 0.2 mm thick and dimensions 2.5 cm×6 cm, with two holes 2 of area 1 $cm^2$ passing through the mica sheet. A rectangle of copper tape 2.5 cm wide and 7 cm long, coated on one side with conducting adhesive, is secured to the base 1 so that there is an overlap of 5 mm at each end. These are folded over to the top of the base 1 and secured there. In this way the holes 2 each comprise a cylindrical pot of height 0.2 mm and area 1 $cm^2$, available to be filled by the sample composite material. The copper tape provides the bottom electrode 3, which is preferably earthed. A probe contact (not shown) may be applied to the upper surface of the composite material within one of the holes 2, providing both the second electrode, and a means of exerting force/pressure. The force may be applied either by calibrated weights, or, for continuous variation, by passing current through a solenoid with a metal core in contact and in line with the probe. The resultant force is measured by a digital scale, preferably accurate to 0.1 g, on which the base sits. In one experimental procedure, 4 bases are used, giving 8 samples for comparison.

Figure 2:
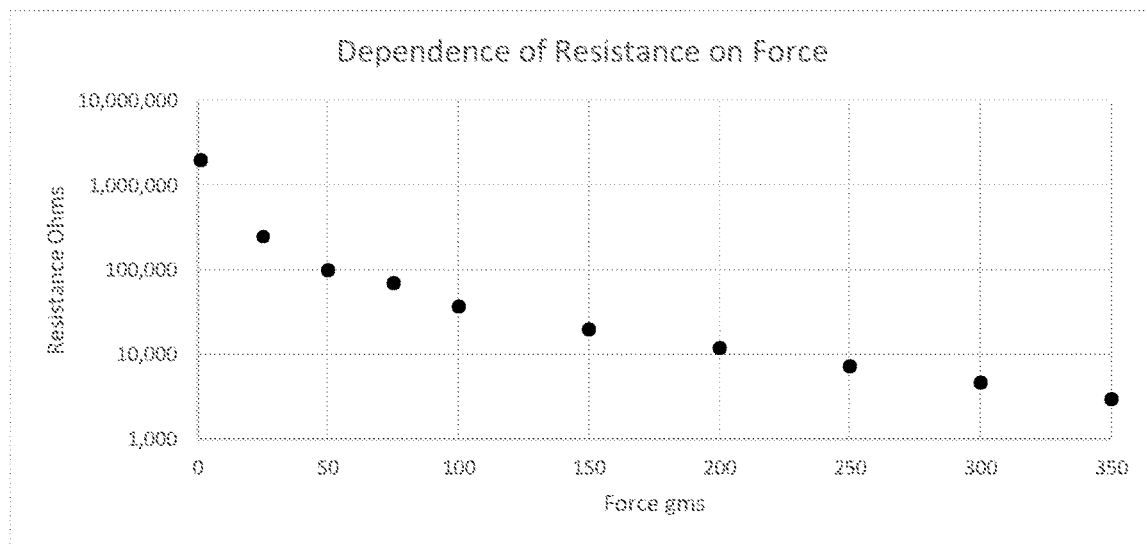
FIG. 2 is a graph of the dependence of resistance on force of a sample of a composite material in an embodiment.

FIG. 2 shows the dependence of resistance on force of iron pyrite powder dispersed in Varathane, a water-based polyurethane manufactured by Rust-Oleum, and conveniently available in a range of Vallejo™ floor paints, which hardens in a few hours at room temperature. The data for FIG. 2 is shown below in Table 1.

TABLE 1

Data for FIG. 2

| Force in grams | Resistance in Ohms |
| --- | --- |
| 0 | |
| 1 | 2,000,000 |
| 25 | 250,000 |
| 50 | 100,000 |
| 75 | 70,000 |
| 100 | 37,000 |
| 150 | 20,000 |
| 200 | 12,000 |
| 250 | 7,300 |
| 300 | 4,700 |
| 350 | 3,000 |

It is often convenient to maintain the polymer as a liquid, and similar results to those shown in FIG. 2 were obtained using Sericol Polyplast PY283. It is easier to spread this mixture if thinned with TS16. The final structure is made by curing at 80° C. for 30 minutes.

The iron pyrite powder was obtained from Right Rocks, Texas. The powder as supplied contains some particles larger than 200 microns, and to ease subsequent screen printing, the powder may be filtered through a 100 micron mesh gauze before use. The powder has a resistivity of about 10,000 Ohm·cm.

A range of candidates for the polymer is available commercially, as paint varnishes or protective coatings. It is preferable to use an elastomer, since in some applications such as touch-sensitive sensors there should be some yielding under small forces. The polymers mentioned herein give good results, but similar results may be obtained with other polymer types.

Tests were also made with $CuFeS_2$ (chalcopyrite), as a fine powder. This was obtained from SS Jewellery Findings, Tasmania, and had a higher conductivity than the iron pyrite samples. Tests made with Varathane as a polymer showed a large variation of resistance with force, but the range was lower than shown in FIG. 2, as may be expected from the low basic resistance.

In the test samples, the composite material was made from approximately equal volumes of solid particles in powder form and fluid polymer, with added water if the polymer is a water-dispersed polyurethane, or for other types of polymer, a solvent appropriate for thinning that particular polymer. The preferred ratio of volumes will depend on the resistivity of the solid particles and the desired pressure range of the sensor. The composite material should be thoroughly stirred before it is applied to the base material of the sensor, which can be metal, plastic, or textile. The composite material may be applied by printing, such as screen printing.

Figure 3:
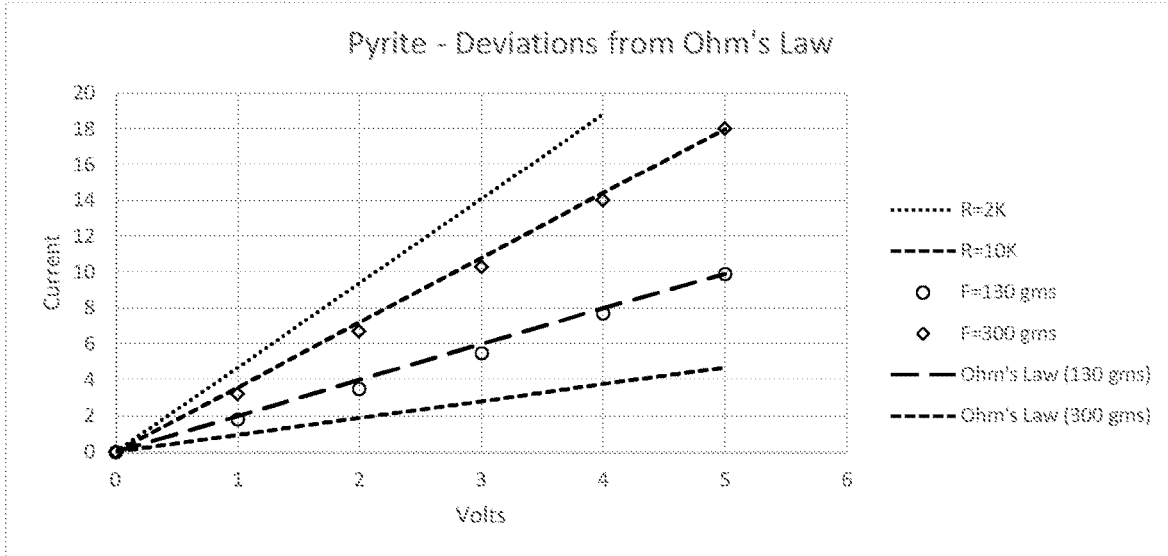
FIG. 3 is a graph of current as a function of voltage for a sample of the composite material in an embodiment, for different forces.

The conductivity mechanism of the samples shows marked differences from the prior art composite materials, because of the surface states mentioned above. One consequence of the different physical mechanisms is a current-voltage dependence that is close to Ohm's Law, as shown in FIG. 3. In this Figure, the two dotted lines indicate calibrations with standard resistances of 2 kΩ and 10 kΩ. The measured points are for a force of 300 grams and 130 grams as labelled on the graph, and as shown below in Table 2.

TABLE 2

Data for FIG. 3

| | Current | | Measured values | | Ohm's Law Lines | | % Deviation | |
|---|---|---|---|---|---|---|---|---|
| Volts | R = 2K | R = 10K | F = 130 gms | F = 300 gms | 130 gms | 300 gms | 130 gms | 300 gms |
| 0 | 0 | 0 | 0 | 0 | 0 | 0 | | |
| 1 | 4.7 | 0.94 | 1.8 | 3.2 | 2 | 3.6 | 10 | 11 |
| 2 | 9.4 | 1.9 | 3.5 | 6.7 | 4 | 7.2 | 12 | 7 |
| 3 | 14.1 | 2.8 | 5.5 | 10.3 | 6 | 10.8 | 10 | 5 |
| 4 | 18.8 | 3.8 | 7.7 | 14 | 8 | 14.4 | 4 | 3 |
| 5 | | 4.7 | 9.9 | 18.0 | 9.9 | 18.0 | | |

Current in Table 2 and FIG. 3 is measured in arbitrary linear units, but calibration using the standard resistances shows that these units are approximately 0.1 mA.

FIG. 3 includes straight lines between the values for the extreme voltages of 0 and 5 V, for both forces. Hence, it can be seen that the measured points correspond closely to Ohm's Law, to within approximately 10%.

Composite materials in embodiments of the invention may be used to manufacture a touch-sensitive sensor, in which force or pressure is applied to the second electrode by touch.

Composite materials in embodiments of the invention may be used to manufacture a wearable force or pressure sensor, in which the composite material is applied as a liquid or paste to a textile, for example so as to impregnate the textile, and the liquid or paste is then dried or cured. The textile may have a conductive (e.g. metal) coating provided therein, forming an electrode of the sensor.

ALTERNATIVE EMBODIMENTS

Alternative embodiments may be envisaged on reading the above description, which may nevertheless fall within the scope of the present invention. The description of embodiments is provided purely by way of example and should not be construed as limiting on the scope of the invention.

What is claimed is:

1. A force or pressure sensor comprising a composite material having a force- or pressure-dependent resistance, the composite material including particles of one or more inorganic pyrite dispersed in an insulating material.

2. The sensor of claim 1, wherein the one or more inorganic pyrite includes iron pyrite, $FeS_2$.

3. The sensor of claim 1, wherein the one or more inorganic pyrite includes chalcopyrite, $CuFeS_2$.

4. The sensor of claim 1, wherein the composite material includes particles of bornite, $CusFeS_4$.

5. The sensor of claim 1, wherein the particles have a resistivity in the range 10 Ohm-cm to 10,000 Ohm-cm.

6. The sensor of claim 1, wherein the material has an ohmic resistance.

7. The sensor of claim 1, wherein the particles are not acicular.

8. The sensor of claim 1, wherein the particles have a diameter of 100 microns or less.

9. The sensor of claim 1, wherein the volume fraction of the particles is greater than 0.25.

10. The sensor of claim 1, wherein the insulating material comprises one or more polymers.

11. The sensor of claim 10, wherein at least one said polymer comprises an elastomer.

12. The sensor of claim 10, wherein at least one said polymer comprises polyurethane.

13. The sensor of claim 1, wherein the composite material is connected between first and second electrodes arranged so that force or pressure may be applied therebetween so as to apply force or pressure to the composite material and thereby change the resistance thereof.

14. The sensor of claim 13, wherein the composite material is deposited on the second electrode.

15. The sensor of claim 14, wherein the second electrode comprises a metal.

16. The sensor of claim 14, wherein the second electrode comprises metal-coated plastic.

17. The sensor of claim 14, wherein the second electrode comprises a textile having a metal coating.

18. A force or pressure sensor comprising a composite material having a force- or pressure-dependent resistance, the composite material including particles of bornite, $CusFeS_4$, dispersed in an insulating material.

19. A method of manufacturing the sensor of claim 1, comprising forming the composite material by dispersing the particles in a fluid polymer and curing or drying the fluid polymer.

20. The method of claim 19, wherein the fluid polymer is a water-dispersed polymer.

* * * * *

UNITED STATES PATENT AND TRADEMARK OFFICE
CERTIFICATE OF CORRECTION

| | |
|---|---|
| PATENT NO. | : 12,338,340 B2 |
| APPLICATION NO. | : 17/608718 |
| DATED | : June 24, 2025 |
| INVENTOR(S) | : Cyril Hilsum |

Page 1 of 1

It is certified that error appears in the above-identified patent and that said Letters Patent is hereby corrected as shown below:

In the Claims

In Column 5, Line 57, Claim 4, "CusFeS$_4$" should be deleted and replaced with "Cu$_5$FeS$_4$"; and In Column 6, Lines 49-50, Claim 18, "CusFeS$_4$" should be deleted and replaced with "Cu$_5$FeS$_4$".

Signed and Sealed this
Twenty-first Day of October, 2025

John A. Squires
*Director of the United States Patent and Trademark Office*